Figure 2:
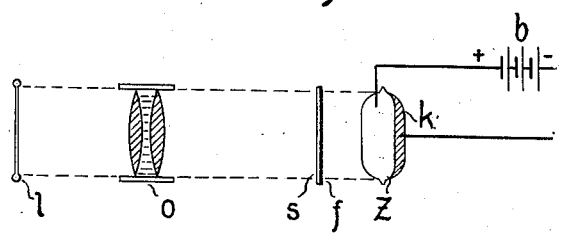

INTENSITY OF LIGHT PASSING THROUGH FILM

THICKNESS OF EMULSION COATING

Patented June 29, 1926.

1,590,185

UNITED STATES PATENT OFFICE.

JOSEF ENGL, OF GRUNEWALD, HANS VOGT, OF BERLIN-SCHONEBERG, AND JOSEPH MASSOLLE, OF GRUNEWALD, GERMANY, ASSIGNORS TO TRI-ERGON LIMITED, OF ZURICH, SWITZERLAND.

LIGHT SOURCE AND LIGHT-SENSITIVE COATING FOR PHONOCINEMATOGRAPHY.

Application filed April 4, 1921, Serial No. 458,634, and in Germany December 22, 1919.

It is known to record by photography the intensities of sound from any source as variations of degree of blackening of, for instance, the silver bromide coating of a moving film. For the reproduction of such photophonograms an optico-electrical method is employed. A small portion of the film is illuminated by an intense source of light of suitable form. The light allowed to pass through the film in accordance with the photographical blackening is concentrated onto an electrical device, (photoelectric cell), in which it sets up electric currents whose strength is dependent upon the energy of radiation, received by the cell, that is to say, according to the degree of absorption of light by the silver bromide coating on the film. When the film moves past the cell an electric acoustically-modulated current is generated, in a circuit including the cell, which current can again be converted into sound waves.

According to the invention sources of light are used, whose light emission is so adapted to the absorption properties of the coating constituting the photophonogram that the fluctuations in the light radiations which impinge upon the photoelectrical device, and consequently the variations in amplitudes of the wave current produced in the circuit of the photoelectric cell, are as great as possible.

In accordance with the invention, also, the photoelectric cell is chosen so as to have maximum or desired sensitiveness to the wave-length of light principally emitted by the light source. The invention is predicated upon the use of a selective light source. that is, one which chiefly emits light of a certain range of wave-lengths, or rays of light at a desired part of the spectrum, and using therewith a film the coating of which is particularly absorptive of such rays; and also using with such source a light-responsive cell the cathode or light-sensitive element of which is particularly sensitive to such rays. This is based upon the observation that different forms of emulsion are absorptive of, or, conversely, are permeable by, different ranges of light wavelengths, to different extents; and also that the light-sensitive materials possible for use in the photo-cell are sensitive to different light wave-lengths to different extents.

The effect of using with a particular selective light source, a coating on the film of maximum absorption properties for the light from that source, is to produce greater variations of light acting upon the photocell, and greater changes in amplitude of current produced by the cell, and more distinct changes of intensity of sound finally produced by the said fluctuating current, than if the light source and emulsion coating were not thus related to each other. The effect of using, with said selective light source, a photo-cell of greatest sensitiveness for the light emitted by that cell, is to give greater amplitude to the current produced by the cell, and therefore greater intensity of sound finally produced, than if the source and cell were not thus related to each other.

Figure 3:
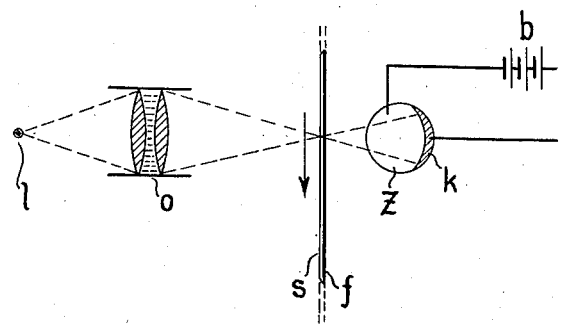
Figure 1:
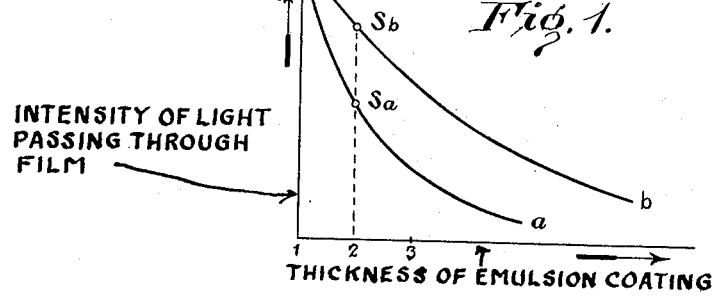

In the accompanying drawings, Figure 1 is a diagram wherein the manner of the absorption of two different radiations for varying thicknesses of the film emulsion coating is represented by curved lines, the horizontal co-ordinate of the diagram representing the thickness of the light-absorbing layer on the film, and the vertical co-ordinate representing the intensity of light allowed to pass through the film; and Figs. 2 and 3 are diagrammatical views, each showing the apparatus in connection with which the present invention may be employed, Fig. 3 being taken at right angles to Fig. 2.

It will be understood that the photographic sound record formed on the emulsion coating of the film varies in intensity, that is to say, by variation in density or thickness of the emulsion coating corresponding to variations of intensity of the original sound which is photographically recorded on the film.

The manner in which emulsion coatings vary in light absorptive properties when subjected to radiations of different characters is illustrated in the diagram Figure 1. If the thickness of the emulsion coating on the film increases, for example, from value one to value two in the diagram, the amount of light from one radiation source which passes through the emulsion coating decreases, as the thickness of the coating increases, according to the curve $b$ from value $S_o$ to $S_b$, and for another source of light, according to curve $a$, from $S_o$ to $S_a$. By the selection of a source of light whose radiation, corresponding to curve $a$, has a high co-efficient of absorption in the emulsion coating of the photophonogram carrier, it is thus possible to make the varying amplitudes of the wave current to be converted into acoustic waves, as great as possible. That is to say, the increased variations of amplitude of the fluctuating current produced by the photoelectric cell are thus increased by the conjoint use of a source of light, the rays chiefly emitted by which are of a particular character, with an emulsion coating on the film which is particularly absorptive of such rays.

In order that the effect of the radiation through the emulsion coating, upon the photoelectric cell or other light sensitive device, shall be as large as possible, the photoelectric device is chosen with absorption properties which are dependent upon the nature of the light source, since the sensitivity to light of such devices, throughout a considerable range of wave-lengths, can be adjusted to certain wave-lengths. That is to say, a current of maximum strength will be provided by the photoelectric device or light responsive device used, the light sensitive element of which has maximum sensitiveness for the rays chiefly emitted by the particular source of light used.

The invention can be practiced in various ways. For example, for the source of light, a mercury vapor lamp may be used in which the vapor is rendered luminous by the passage of an electric current therethrough. This lamp may be the intensely luminous quartz lamp, known in science for other purposes, in which the major portion of the radiation intensity is located at the short wave boundary of the visible spectrum and within the ultra violet range. With such a light source, a photoelectric cell should be used, the maximum sensitivity of which lies within this portion of the spectrum, for instance an alkali photoelectric cell having a cathode of metallic sodium.

If an emulsion coating of silver of varying permeability be used as represented for instance by a film having a photographic imprint which has been developed, the absorptivity of the thin silver coating is minimum for light rays of wave-lengths corresponding to the violet and ultra violet end of the spectrum. Because silver coatings are particularly permeable for light of such wave-lengths, they are replaced in accordance with this invention by emulsion coatings of mercury or copper, for example when the light source is a mercury vapor lamp. Therefore, in this example the light source emits largely the ultra violet rays, which pass most easily through the quartz glass of the lamp; the film coating has maximum absorption properties for such rays and the cathode of the photo cell has maximum sensitivity for such rays.

In the selection of the source of light it must further be taken into consideration that it is desirable to filter out all the radiation energy other than the rays for which the particular light source is selected. That is to say, in the above example the infra red and the rest of the visible radiations may be screened out by the provision of suitable light filters located between the source of light and the film, since this portion of the light emitted by the source is unnecessary and may render the technical solution of the problem of reproducing sound vibrations impossible. For this reason and also on account of the well known spectral selectivity of the photoelectric device, it is generally of advantage to use sources of light, the radiation of which has a selective character. Radiating bodies which possess a continuous emission spectrum, such as heated solid bodies (metallic wires, Nernst glowers, incandescent carbon electrodes of the light arc, etc.) are therefore less suitable. Light sources with selective radiation are, for example, metallic vapors which have been rendered luminous by an electric discharge of currents of high intensity. Selective light sources which may thus be used are mercury, cadmium and zinc lamps, which are well known in the technical arts for other uses. A cadmium vapor lamp, for instance, might be used with a photoelectric cell having a cathode of rubidium as the photoelectric element of maximum sensitivity for use with this particular light source. The cadmium lamp chiefly produces red rays and the rubidium cell may be used with it since it is most sensitive to the red rays. A film coating of maximum absorptivity for these red rays should, of course be used.

We claim:

1. In sound reproducing apparatus, the combination of a source of light, a light-sensitive cell, and a transparent film having a sensitive emulsion coating thereon, movable between the light-source and cell said coating having a photographic sound record of varying light-permeability formed thereon; said source being adapted to emit rays of greatest intensity at one part of the spectrum, said cell having a light-sensitive element which is most sensitive to such rays, and the coating on the film being of such character as to be more absorptive of such rays than of light rays at other parts of the spectrum.

2. In sound reproducing apparatus, the combination of a source of light, a light-sensitive cell, and a transparent film having a sensitive emulsion coating thereon, movable between the light-source and cell, said coating having a photographic sound record of varying light-permeability formed thereon; said source being a luminous metallic vapor having a spectral selectivity such that it chiefly emits light rays belonging to only one part of the spectrum, said cell having a light sensitive element which is most sensitive to such rays, and the coating on the film being of such character as to be more absorptive of such rays than of light rays at other parts of the spectrum.

3. In sound reproducing apparatus, the combination of a source of light, a light-sensitive cell, and a transparent film having a sensitive emulsion coating thereon, movable between the light-source and cell, said coating having a photographic sound record of varying light-permeability formed thereon; said source being a luminous metallic vapor lamp having a spectral selectivity such that it chiefly emits light rays at the short wave end of the visible spectrum and in the ultra violet region, said cell having an alkali cathode which is most sensitive to said rays, and the coating on the film being a layer of mercury, adapted to be more absorptive of such rays than of light rays at other parts of the spectrum.

4. In sound reproducing apparatus, the combination of a source of light, a light-sensitive cell, and a transparent film having a sensitive emulsion coating thereon, movable between the light-source and cell, said coating having a photographic sound record of varying light-permeability formed thereon; said source being a mercury vapor lamp emitting rays of greatest intensity at the short wave end of the visible spectrum and in the ultra-violet region, said cell having a sodium cathode, and the coating on the film comprising a layer of mercury.

5. In sound reproducing apparatus, the combination of a light source of spectral selectivity such that it chiefly emits light rays belonging to only one part of the spectrum, a photo-cell, and a transparent film movable between the light-source and cell and light filtering means between said source and film for screening out rays of the other wave-lengths than those chiefly emitted by said source, said film having a sensitive emulsion coating thereon having a photographic sound record in which varying intensities of sound are represented by lines or portions of correspondingly varying density or thickness of emulsion, said emulsion coating being of such character as to be more absorptive of rays of the wave-lengths chiefly emitted by said source than of light rays at other parts of the spectrum.

6. A process of reproducing sound, comprising, selecting a source of light of spectral selectivity such that it emits light rays of greatest intensity at a desired part of the spectrum, selecting a film for a photographic sound record having an emulsion coating of such a character as to be more absorptive of rays of the wave-lengths chiefly emitted by said source than of light-rays at other parts of the spectrum, producing on such film a photographic sound record in which varying intensities of sound are represented by lines or portions of correspondingly varying density or thickness of emulsion, and selecting a photoelectric cell having a light sensitive element which is most sensitive to such rays, progressing said film between said source and said cell so that light from said source will pass through said film to greater or less degree and fall upon the light sensitive element of said cell, said cell being connected in a circuit in which a sound modulated current will flow, and causing such current to reproduce the sound.

In testimony whereof we affix our signatures.

DR. JOSEF ENGL.
HANS VOGT.
JOSEPH MASSOLLE.